United States Patent
Kwak

(10) Patent No.: US 11,349,652 B2
(45) Date of Patent: May 31, 2022

(54) SECURITY DEVICE INCLUDING PHYSICAL UNCLONABLE FUNCTION CELLS AND OPERATION METHOD THEREOF

(71) Applicant: SAMSUNG ELECTRONICS CO., LTD., Suwon-si (KR)

(72) Inventor: Sung Ung Kwak, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/819,694

(22) Filed: Mar. 16, 2020

(65) Prior Publication Data
US 2020/0358609 A1   Nov. 12, 2020

(30) Foreign Application Priority Data

May 8, 2019   (KR) .................. 10-2019-0053945
Aug. 6, 2019  (KR) .................. 10-2019-0095660

(51) Int. Cl.
*H04L 9/08*   (2006.01)

(52) U.S. Cl.
CPC .................................. *H04L 9/0877* (2013.01)

(58) Field of Classification Search
CPC . H04L 9/0877; H04L 2209/12; H04L 9/0866; H04L 9/3278; H04L 9/08; G06F 21/73; G06F 21/602
See application file for complete search history.

(56) References Cited

U.S. PATENT DOCUMENTS

| | | | |
|---|---|---|---|
| 9,485,094 B1 | 11/2016 | Parvarandeh et al. | |
| 9,584,329 B1* | 2/2017 | Trimberger | H04L 9/3278 |
| 2017/0235941 A1* | 8/2017 | Kim | G06F 21/44 |
| | | | 726/19 |
| 2018/0102907 A1* | 4/2018 | Lin | H04L 9/3278 |
| 2018/0159685 A1 | 6/2018 | Kwak | |

* cited by examiner

*Primary Examiner* — Quazi Farooqui
(74) *Attorney, Agent, or Firm* — Sughrue Mion, PLLC

(57) ABSTRACT

A security device includes a physical unclonable function (PUF) cell array including a plurality of PUF cells, and a controller configured to control the PUF cell array to generate a security key. The controller includes a receiver configured to receive raw data from the plurality of PUF cells, a mapping table generator configured to extract stable data from the received raw data by discarding unstable data of the received raw data, and generate a mapping table based on stable PUF cells corresponding to the extracted stable data, among the plurality of PUF cells, a PUF cell controller configured to read sensing data from the stable PUF cells, based on the generated mapping table, and a bit determiner configured to generate the security key, based on the read sensing data.

19 Claims, 14 Drawing Sheets

MT

| Index | GR1 | GR2 |
|---|---|---|
| ID01 | PUF0003 | PUF256 |
| ⋮ | | |
| ID64 | PUF124 | PUF126 |

SECURITY DEVICE INCLUDING PHYSICAL UNCLONABLE FUNCTION CELLS AND OPERATION METHOD THEREOF

CROSS-REFERENCE TO THE RELATED APPLICATIONS

This application is based on and claims priority under 35 U.S.C. § 119 to Korean Patent Application No. 10-2019-0053945 filed on May 8, 2019, and Korean Patent Application No. 10-2019-0095660 filed on Aug. 6, 2019, in the Korean Intellectual Property Office, the disclosures of which are incorporated by reference herein in their entireties.

BACKGROUND

Apparatuses and methods consistent with embodiments relate to a security device, and more particularly, relate to a security device including physical unclonable function (PUF) cells and an operation method thereof.

A technology for security and encryption is used in communication and mobile devices. Because a key generated in a software manner is able to be leaked out through hacking, nowadays, a hardware-based security manner is being developed.

For example, a semiconductor device having a physical unclonable function (PUF) is being developed. The PUF refers to a function or device that generates a unique key randomly depending on process, voltage, and temperature (PVT) variations in a semiconductor device. Because the PUF generates a random key depending on the PVT variations, an error may occur in a key due to various environment factors. This error causes the reduction of reliability of the semiconductor device or the security device, which has the PUF.

SUMMARY

According to embodiments, a security device includes a physical unclonable function (PUF) cell array including a plurality of PUF cells, and a controller configured to control the PUF cell array to generate a security key. The controller includes a receiver configured to receive raw data from the plurality of PUF cells, a mapping table generator configured to extract stable data from the received raw data by discarding unstable data of the received raw data, and generate a mapping table based on stable PUF cells corresponding to the extracted stable data, among the plurality of PUF cells, a storage circuit configured to store the mapping table, a PUF cell controller configured to read sensing data from the stable PUF cells, based on the generated mapping table, and a bit determiner configured to generate the security key, based on the read sensing data.

According to embodiments, an operation method of a security device including a plurality of physical unclonable function (PUF) cells, includes reading raw data from the plurality of PUF cells, extracting stable data from the read raw data by discarding unstable data of the read raw data, and generating a mapping table by mapping stable PUF cells corresponding to of the extracted stable data. The operation method further includes selecting a target PUF cell from the plurality of PUF cells, selecting an assisted PUF cell corresponding to the selected target PUF cell, from the stable PUF cells, based on the mapping table, reading target sensing data from the selected target PUF cell, reading assisted sensing data from the selected assisted PUF cell, and determining a target bit value of the target PUF cell, based on the read target sensing data and the read assisted sensing data.

According to embodiments, an operation method including a plurality of physical unclonable function (PUF) cells, includes reading raw data from the plurality of PUF cells, extracting stable data from the read raw data by discarding unstable data of the read raw data, and generating a mapping table based on the extracted stable. The operation method further includes reading sensing data from stable PUF cells corresponding to the extracted stable data, among the plurality of PUF cells, based on the generated mapping table, generating determination data, based on the read sensing data, and generating a security key based on the generated determination data. The raw data has a first distribution, the stable data has a second distribution different from the first distribution, and the determination data has a third distribution different from the first distribution and the second distribution.

DETAILED DESCRIPTION

Below, embodiments of the inventive concept may be described in detail and clearly to such an extent that an ordinary one in the art easily implements the inventive concept.

Components described in the detailed description with reference to terms "part," "unit," "module," "layer," etc. and function blocks illustrated in drawings may be implemented in the form of software, hardware, or a combination thereof. In an embodiment, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Also, unless differently defined, all terms used herein, which include technical terminologies or scientific terminologies, have the same meaning as that understood by a person skilled in the art to which the inventive concept belongs. Terms defined in a generally used dictionary are to be interpreted to have meanings equal to the contextual meanings in a relevant technical field, and are not interpreted to have ideal or excessively formal meanings unless clearly defined in the specification.

Figure 1:
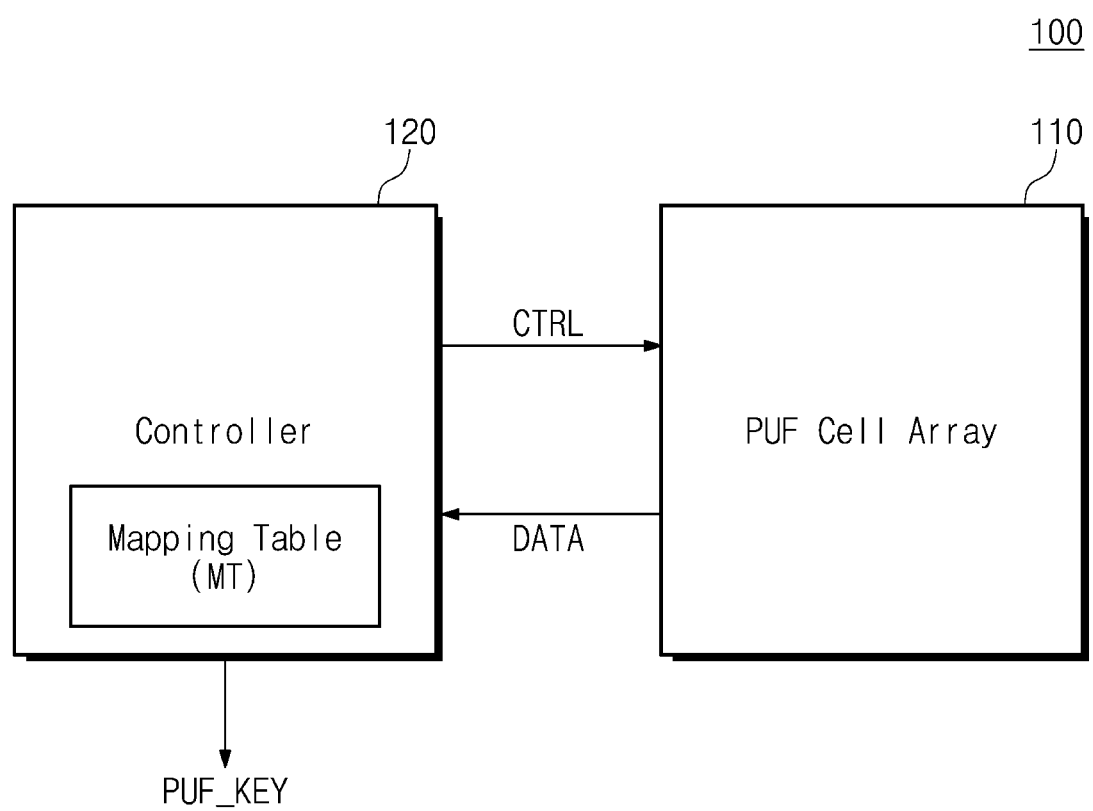
FIG. 1 is a block diagram illustrating a security device according to embodiments.

FIG. 1 is a block diagram illustrating a security device according to embodiments. Referring to FIG. 1, a security device 100 may include a physical unclonable function (PUF) cell array 110 and a controller 120.

The PUF cell array 110 may include a plurality of PUF cells. In an example embodiment, each of the PUF cells may be implemented with any one or any combination of various kinds of PUF cells such as a PUF cell based on a threshold voltage of a transistor, an arbiter-based PUF cell (e.g., a feed-forward PUF cell, an XOR PUF cell in which arbiter PUF cells are arranged in parallel, or a lightweight PUF cell), a ring oscillator-based PUF cell, a memory-based PUF cell (e.g., a static random access memory (SRAM) PUF cell, a latch PUF cell, a flash memory PUF cell, or a memristor PUF cell), and a PUF cell reconfigurable according to a laser beam or a thermal variation. Below, to describe the technical idea of the inventive concept easily, it is assumed that each of the plurality of PUF cells is a PUF cell based on a threshold voltage of a transistor. However, the inventive concept is not limited thereto. For example, each of the plurality of PUF cells may be implemented with various types of PUF cells.

In an example embodiment, the PUF cell array 110 may be implemented with one semiconductor chip, one semiconductor die, or one semiconductor device.

The plurality of PUF cells have different PVT variations. Each of the plurality of PUF cells may be configured to output data according to the corresponding PVT variation. For example, even though the plurality of PUF cells are manufactured by the same semiconductor processes or on the same wafer, the plurality of PUF cells may have different PVT variations. Data that are read from a PUF cell may correspond to mismatch information (e.g., Vgs mismatch) of each PUF cell, which is generated by various factors such as a doping concentration, a thickness of a gate oxide layer, and a geometric structure of the PUF cell. That is, even though a first PUF cell and a second PUF cell are manufactured by the same semiconductor processes or on the same wafer, data of the first PUF cell may have a positive polarity, while the second PUF cell may have a negative polarity; alternatively, an absolute value of the data of the first PUF cell may be relatively greater than an absolute value of the data of the second PUF cell.

In an example embodiment, data of each of the plurality of PUF cells may be measured or detected by using a separate sensing device or a separate test device. Below, for convenience of description, a description will be given as data (e.g., raw data or sensing data to be described below) are read from each of the plurality of PUF cells. That is, to read data (e.g., raw data or sensing data) from a PUF cell may mean to obtain mismatch information from the PUF cell through a separate sensing device or a separate test device or to obtain mismatch information directly from the PUF cell. However, the inventive concept is not limited thereto.

The controller 120 may read data from the PUF cell array 110. For example, the controller 120 may provide the PUF cell array 110 with a control signal CTRL for reading data DATA from each of the plurality of PUF cells included in the PUF cell array 110. The PUF cell array 110 may output data DATA associated with a corresponding PUF cell in response to the control signal CTRL.

The controller 120 may be configured to generate a security key PUF_KEY based on the data read from the corresponding PUF cell. For example, the controller 120 may determine a polarity of the data read from a PUF cell and may generate the security key PUF_KEY based on the determined polarity. In an example embodiment, the security key PUF_KEY may include a plurality of bits, and the plurality of bits may correspond to the plurality of PUF cells in the PUF cell array 110, respectively. In an example embodiment, the number of bits included in the security key PUF_KEY may be different from the number of PUF cells included in the PUF cell array 110.

In an example embodiment, because the plurality of PUF cells have different PVT variations, a polarity of the data from PUF cells may be changed by various different ambient factors (e.g., an operating temperature, an operating time, and an operating voltage). In this case, a bit that is determined with regard to the PUF cells may vary, thereby causing the reduction of reliability of the security key PUF_KEY. To discard a bit determination error due to various ambient factors, the controller 120 according to an embodiment of the inventive concept may remove unstable data from obtained data to extract stable data, may generate a mapping table MT based on the extracted stable data, and may perform a bit determination operation based on the generated mapping table MT. As such, an error of the security key PUF_KEY may decrease. How the controller 120 generates a mapping table MT and generates the security key PUF_KEY will be more fully described with reference to drawings below.

Figure 2:
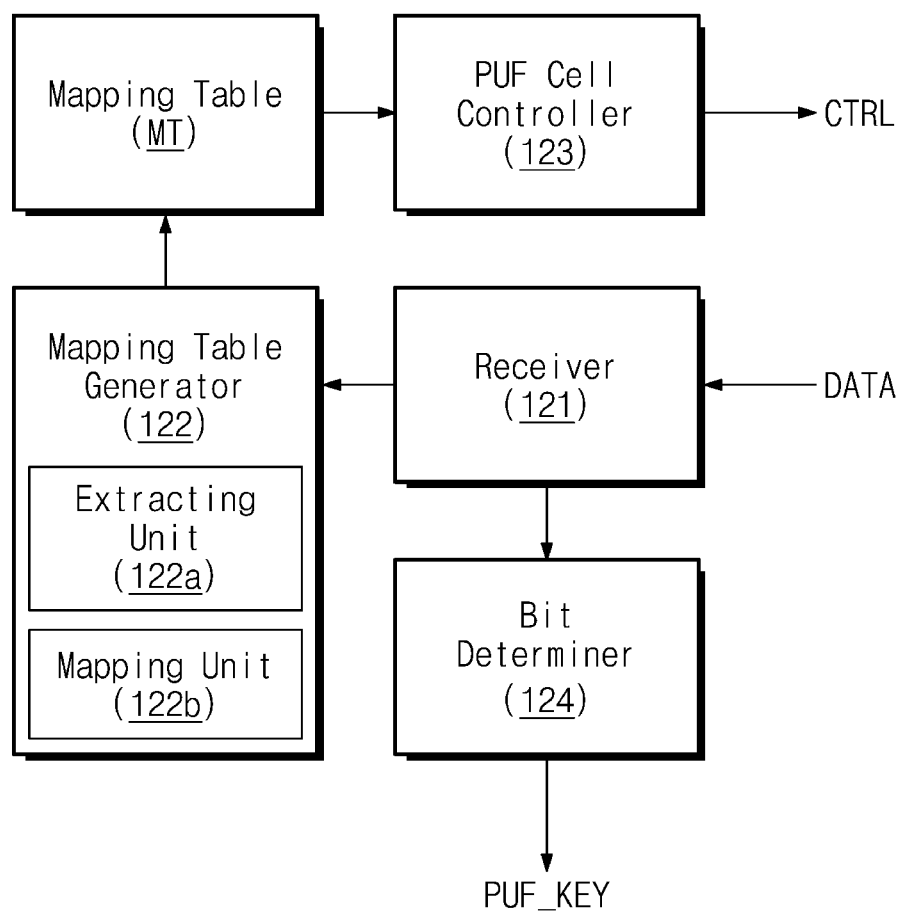
FIG. 2 is a block diagram illustrating a controller of FIG. 1.

FIG. 2 is a block diagram illustrating the controller 120 of FIG. 1. Below, for convenience of description, data read from each of a plurality of PUF cells is referred to as "raw data" or "sensing data." The raw data may indicate data read from each of the plurality of PUF cells for the purpose of generating the mapping table MT in the process of manufacturing the security device 100, and the sensing data may indicate data read from a plurality of PUF cells for the purpose of generating the security key PUF_KEY after the security device 100 is manufactured. However, the terms are to describe the technical idea of the inventive concept easily, and the inventive concept is not limited thereto. For convenience of description, the terms "raw data" and "sensing data" may be interchangeably used.

Referring to FIGS. 1 and 2, the controller 120 may include a receiver 121, a mapping table generator 122, a PUF cell controller 123, a bit determiner 124, and the mapping table MT. For example, the receiver 121 may receive raw data RD from each of the plurality of PUF cells. In an example embodiment, the raw data RD received from each of the plurality of PUF cells may be a value of an analog form (e.g., a mismatch value associated with a factor of each PUF cell). The receiver 121 may be an analog-to-digital converter (ADC) configured to convert the raw data RD from an analog form to a digital form.

The receiver 121 may provide the converted raw data RD to the mapping table generator 122 or the bit determiner 124 depending on an operation mode. For example, when the security device 100 or the controller 120 operates in a first operation mode, the receiver 121 may provide the converted raw data RD to the mapping table generator 122. Alternatively, when the security device 100 or the controller 120 operates in a second operation mode, the receiver 121 may provide the converted raw data RD to the bit determiner 124. In an example embodiment, the first operation mode may indicate an initialization mode or an operation mode for generating or updating the mapping table MT or may indicate an operation mode that is performed in the process of manufacturing the security device 100. The second operation mode may indicate an operation mode for generating the security key PUF_KEY.

In an example embodiment, the operation mode of the security device 100 or the controller 120 is an example for describing an embodiment of the inventive concept clearly, and the inventive concept is not limited thereto. For example, the receiver 121 may provide the converted raw data RD to both the bit determiner 124 and the mapping table generator 122.

The mapping table generator 122 may receive the raw data RD from the receiver 121. The mapping table generator 122 may generate the mapping table MT based on the raw data RD.

For example, the mapping table generator 122 may include an extracting unit 122a and a mapping unit 122b. The extracting unit 122a may extract stable data from the raw data RD received from the receiver 121. In detail, the extracting unit 122a may receive the raw data RD associated with each of the plurality of PUF cells included in the PUF cell array 110. The extracting unit 122a may classify the plurality of PUF cells into a plurality of groups based on the raw data RD. The extracting unit 122a may discard PUF cells (or information about the PUF cells) corresponding to a group from among the plurality of groups.

In an example embodiment, PUF cells corresponding to a group to be discarded may be unstable PUF cells. That is, information about PUF cells corresponding to a group may indicate unstable data, and the remaining data may indicate stable data. The unstable data may indicate raw data having a relatively high probability that a polarity is to be changed due to various ambient factors, and the stable data may indicate raw data having a relatively low probability that a polarity is to be changed due to various ambient factors. In other words, the extracting unit 122a may extract stable data by discarding unstable data of the obtained raw data RD.

The mapping unit 122b may generate the mapping table MT based on the extracted stable data (i.e., raw data corresponding to PUF cells not included in a group). In an example embodiment, the mapping table MT may include mapping information of two PUF cells mapped in compliance with a given rule. In an example embodiment, the given rule will be more fully described with reference to drawings below.

In an example embodiment, after the mapping table MT is stored in a separate storage circuit, the mapping table generator 122 may discard a plurality of raw data.

In an example embodiment, the mapping table MT may be generated based on the plurality of PUF cells included in the one PUF cell array 110 that is implemented with one semiconductor chip, one semiconductor die, or one semiconductor device.

The PUF cell controller 123 may output the control signal CTRL for controlling each of the plurality of PUF cells of the PUF cell array 110 based on the mapping table MT. For example, it is assumed that the mapping table MT includes mapping information between a first PUF cell and a second PUF cell and the first PUF cell is a target PUF cell. In this case, the PUF cell controller 123 may output the control signal CTRL such that two sensing data are obtained from the first PUF cell being a target PUF cell of the plurality of PUF cells of the PUF cell array 110 and the second PUF cell corresponding to the target PUF cell.

The two sensing data corresponding to the first and second PUF cells may be received by the receiver 121, and the receiver 121 may provide the two sensing data to the bit determiner 124. In an example embodiment, the receiver 121 may convert each of the two sensing data to a digital signal and may provide the digital signal to the bit determiner 124.

The bit determiner 124 may determine a target bit associated with the first PUF cell based on the two sensing data. For example, when a size (or value or magnitude) of the sensing data corresponding to the first PUF cell being the target PUF cell from among the two sensing data is greater than that of the other sensing data, a value of a target bit associated with the first PUF cell may be determined as "bit 1"; when the size (or value) of the sensing data corresponding to the first PUF cell being the target PUF cell is smaller than that of the other sensing data, a value of a target bit associated with the first PUF cell may be determined as "bit 0."

Alternatively, the bit determiner 124 may generate determination data based on the two sensing data. For example, the bit determiner 124 may generate the determination data by subtracting the sensing data corresponding to the second PUF cell from the sensing data corresponding to the first PUF cell. The bit determiner 124 may determine a value of a target bit associated with the first PUF cell based on a polarity of the determination data. However, the inventive concept is not limited thereto. For example, the bit determination method may be variously changed.

As described above, the security device 100 according to an embodiment of the inventive concept may generate the mapping table MT based on raw data associated with each of the plurality of PUF cells. In this case, the security device 100 may extract stable data by discarding raw data (i.e., unstable data) corresponding to PUF cells included in a group from the raw data RD. The security device 100 may generate a mapping table for the remaining PUF cells not included in the group based on the extracted stable data, may determine a target bit corresponding to each PUF cell by using the generated mapping table, and may generate the security key PUF_KEY based on the determined target bits. Accordingly, the reliability of the security key PUF_KEY generated by the security device 100 may be improved.

Figure 3:
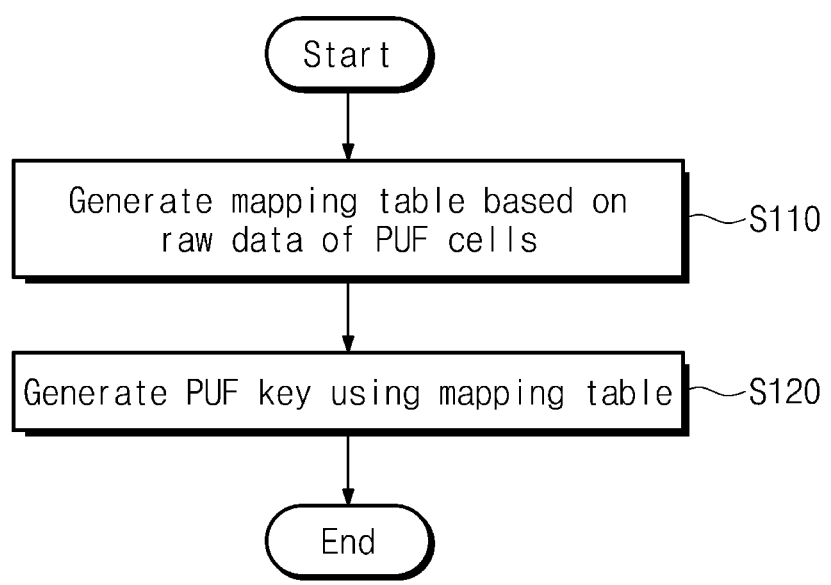
FIG. 3 is a flowchart illustrating an operation of the security device of FIG. 1.

FIG. 3 is a flowchart illustrating an operation of the security device 100 of FIG. 1. Referring to FIGS. 1 to 3, in operation S110, the security device 100 may generate the mapping table MT based on the raw data RD of the plurality of PUF cells. For example, the mapping table generator 122 may generate the mapping table MT based on raw data obtained from the plurality of PUF cells. Operation S110 will be more fully described with reference to FIGS. 4, 5A, 5B, and 5C.

In operation S120, the security device 100 may generate a PUF key using the mapping table MT. For example, the controller 120 may select a target PUF cell (e.g., a first PUF cell) from the plurality of PUF cells. The controller 120 may control the PUF cell array 110 based on the mapping table MT such that sensing data are respectively read from the first PUF cell being the target PUF cell and a second PUF cell mapped onto the first PUF cell. The bit determiner 124 may determine a target bit corresponding the first PUF cell being the target PUF cell based on two sensing data read from the first and second PUF cells. The controller 120 may determine a plurality of target bits by performing the above-described target bit determination operation on each of the plurality of PUF cells, and may generate the security key PUF_KEY by combining the plurality of target bits thus determined.

Figure 4:
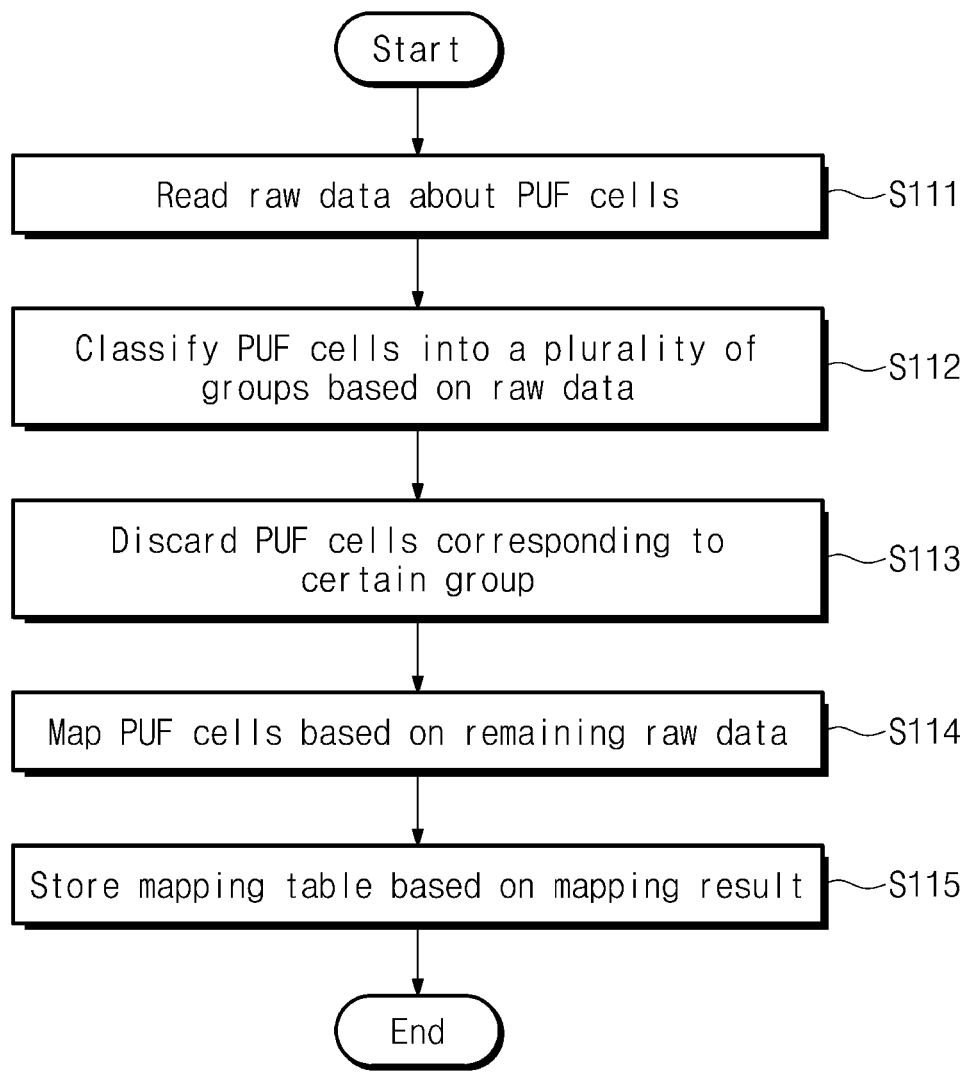
FIG. 4 is a flowchart illustrating operation S110 illustrated in FIG. 3.
Figure 5A:
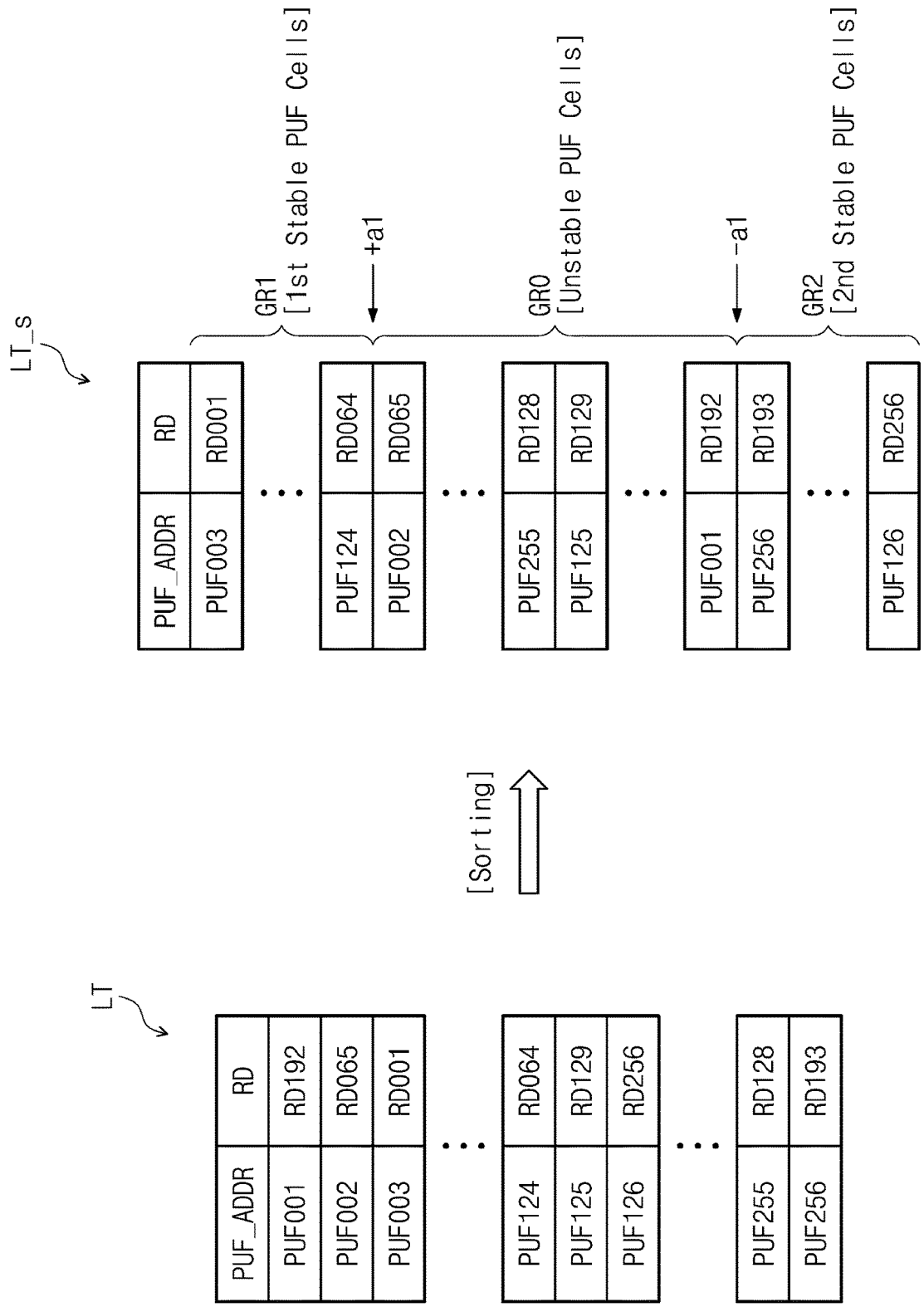
FIGS. 5A, 5B and 5C are diagrams for describing an operation according to the flowchart of FIG. 4.
Figure 5B:
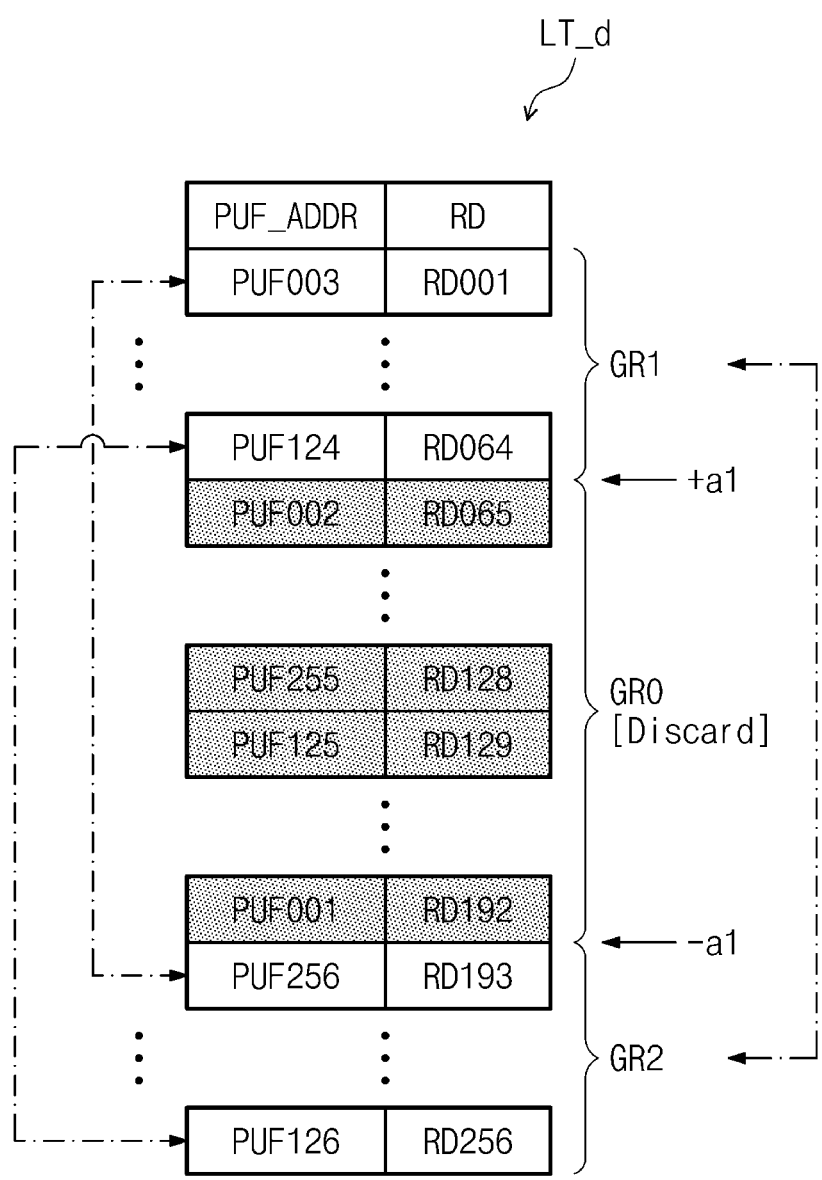
Figure 5C:

FIG. 4 is a flowchart illustrating operation S110 illustrated in FIG. 3. FIGS. 5A, 5B and 5C are diagrams for describing an operation according to the flowchart of FIG. 4. For convenience of description, below, it is assumed that the PUF cell array 110 may include 1st to 256th PUF cells PUF001 to PUF256 (i.e., 256 PUF cells). Also, a reference numeral of each of the 1st to 256th PUF cells PUF001 to PUF256 may indicate a PUF cell or may mean a PUF address PUF_ADDR indicating a physical location of a PUF cell. It is assumed that the 1st to 256th PUF cells PUF001 to PUF256 output different raw data RD depending on respective PVT variations.

For convenience of description, an operation according to the flowchart of FIG. 4 will be described with reference to the security device 100 of FIG. 1. However, the inventive concept is not limited thereto. An operation according to an embodiment of the inventive concept may be performed by the security device 100, the controller 120, or any other component(s).

Referring to FIGS. 1 to 4, the security device 100 may perform operation S111 to operation S115 to generate the mapping table MT. In operation S111, the security device 100 may obtain the raw data RD about each of the plurality of PUF cells. For example, as described above, the receiver 121 of the controller 120 may receive raw data RD001 to RD256 respectively associated with the plurality of PUF cells PUF001 to PUF256.

In detail, as illustrated in FIG. 5A, the receiver 121 may respectively receive 192th, 65th, and 1st raw data RD192, RD065, and RD001 from the first, second, and third PUF cells PUF001, PUF002, and PUF003, may respectively receive 64th, 129th, and 256th raw data RD064, RD129, and RD256 from the 124th, 125th, and 126th PUF cells PUF124, PUF125, and PUF126, and may respectively receive 128th and 193th raw data RD128 and RD193 from the 255th and 256th PUF cells PUF255 and PUF256. For brevity of illustration, some PUF cells are only illustrated in FIG. 5A, but the inventive concept is not limited thereto. For example, the receiver 121 may receive raw data RD about the remaining PUF cells. In an example embodiment, the received raw data may be an analog value, and the receiver 121 may be configured to convert an analog value of the received raw data into a digital value.

In an example embodiment, the mapping table generator 122 of the controller 120 may generate a list LT illustrated in FIG. 5A based on the received raw data. The list LT may include PUF cell addresses PUF_ADDR of the plurality of PUF cells and raw data values corresponding to the PUF cell addresses PUF_ADDR. In an example embodiment, for convenience of description, reference numerals of raw data may be listed in the order of size of raw data, but the inventive concept is not limited thereto. In an example embodiment, at least two raw data of at least two PUF cells may have the same value.

Referring again to FIG. 4, in operation S112, the security device 100 may classify the plurality of PUF cells into a plurality of groups based on raw data. For example, as illustrated in FIG. 5A, the mapping table generator 122 of the controller 120 may sort the generated list LT in the order of size of the raw data RD and may generated a sorted list LT_s. The mapping table generator 122 may classify the plurality of PUF cells PUF001 to PUF256 into the plurality of groups based on the sorted list LT_s and reference values.

In detail, as illustrated in FIG. 5A, the plurality of PUF cells PUF001 to PUF256 may be classified into 0-th, first, and second groups GR0, GR1, and GR2 based on reference values "+a1" and "−a1." For example, PUF cells corresponding to raw data (e.g., RD001 to RD064) greater than a first positive reference value +a1 may be classified as the first group GR1. PUF cells corresponding to raw data (e.g., RD193 to RD256) smaller than a first negative reference value −a1 may be classified as the second group GR2. PUF cells corresponding to raw data (e.g., RD065 to RD192) that are smaller than the first positive reference value +a1 and is greater than the first negative reference value −a1 may be classified as the 0-th group GR0.

In this case, the PUF cells corresponding to the 0-th group GR0 may be unstable PUF cells, the PUF cells corresponding to the first group GR1 may be first stable PUF cells, and the PUF cell corresponding to the second group GR2 may be second stable PUF cells. In other words, an absolute value of each of raw data read from the unstable PUF cells corresponding to the 0-th group GR0 may be smaller than a reference value. In this case, the unstable PUF cells may indicate PUF cells having a high probability that sensing data are able to be changed due to various external or internal factors such as a temperature, an operating time, and an operating voltage. That is, the sensing data read from the unstable PUF cells may have a high probability of including an error.

In an example embodiment, the reference values +a1 and −a1 may be determined in various manners. For example, the reference values +a1 and −a1 may be determined based on the number of PUF cells. That is, the first positive reference value +a1 may be determined such that the number of PUF cells included in the first group GR1 is 25% of the total number of PUF cells, and the first negative reference value −a1 may be determined such that the number of PUF cells included in the second group GR2 is 25% of the total number of PUF cells. In this case, the number of PUF cells included in the 0-th group GR0 may be 50% of the total number of PUF cells. The above-described numerical values may be an example for describing the technical idea of the inventive concept easily, and the inventive concept is not limited thereto.

In an example embodiment, the reference values +a1 and −a1 may be determined based on a distance between raw data of PUF cells included in the first group GR1 and raw data of PUF cells included in the second group GR2. In an example embodiment, the reliability of the security key PUF_KEY generated from the security device 100 may vary depending on the reference values +a1 and −a1.

Referring again to FIG. 4, in operation S113, the security device 100 may discard PUF cells (or raw data of the PUF cells) corresponding to a certain group. For example, as illustrated in FIG. 5B, the mapping table generator 122 may generate a list LT_d (hereinafter referred to as a "discard list") by discarding information (i.e., unstable data) about the group from the sorted list LT_s. That is, the discard list LT_d may be generated by discarding information (i.e., unstable data) about PUF cells included in the 0-th group GR0 from the sorted list LT_s. In this case, the discard list LT_d may maintain only information (i.e., PUF addresses and raw data) about PUF cells included in the first group GR1 and the second group GR2. In other words, the discard list LT_d may only include addresses and raw data of PUF cells associated with stable data.

Referring again to FIG. 4, in an example embodiment, operation S112 and operation S113 may be performed by the extracting unit 122a of the mapping table generator 122 in the controller 120 described above. That is, stable data may be extracted from the raw data RD through operation S112 and operation S113.

In operation S114, the security device 100 may perform mapping on PUF cells based on the remaining raw data (i.e., stable data). For example, as illustrated in FIG. 5B, the discard list LT_d may only include information (e.g., stable data) about PUF cells (i.e., the first and second stable PUF cells) included in the first group GR1 and the second group GR2. The mapping table generator 122 may map the PUF cells of the first group GR1 onto the PUF cells of the second group GR2 based on the discard list LT_d.

In detail, as illustrated in FIGS. 5B and 5C, a PUF cell (e.g., PUF003) having the greatest raw data (e.g., RD001) from among the PUF cells of the first group GR1 may be mapped onto a PUF cell (e.g., PUF256) having the greatest raw data (e.g., RD193) from among the PUF cells of the second group GR2. A PUF cell (e.g., PUF124) having the smallest raw data (e.g., RD064) from among the PUF cells of the first group GR1 may be mapped onto a PUF cell (e.g., PUF126) having the smallest raw data (e.g., RD256) from among the PUF cells of the second group GR2. That is, the PUF cells included in the first group GR1 and the PUF cells included in the second group GR2 may be mapped in a 1:1 correspondence based on sizes of raw data.

Referring again to FIG. 4, in operation S115, the security device 100 may store the mapping table MT based on a mapping result. For example, the mapping table generator 122 may generate the mapping table MT through the above-described mapping operation. The mapping table MT may include mapping information of the PUF cells included in the first group GR1 and the PUF cells included in the second group GR2. As illustrated in FIG. 5C, a first index ID01 may include mapping information between the 3rd PUF cell PUF003 of the first group GR1 and the 256th PUF cell PUF256 of the second group GR2, and a 64th index ID64 may include mapping information between the 124th PUF cell PUF124 of the first group GR1 and the 126th PUF cell PUF126 of the second group GR2. The generated mapping table MT may be stored in a separate storage circuit or a nonvolatile memory. In an example embodiment, the mapping table MT may not include information about raw data respectively associated with the plurality of PUF cells. For example, as illustrated in FIG. 5C, the mapping table MT may include only physical address information about PUF cells mapped in the 1:1 correspondence. In an example embodiment, after the mapping table MT is generated, the raw data RD read from the plurality of PUF cells may be discarded.

Referring again to FIG. 4, in an example embodiment, operation S114 and operation S115 may be performed by the mapping unit 122b of the mapping table generator 122 in the controller 120 of FIG. 2.

In an example embodiment, the PUF cell controller 123 may control the PUF cell array 110 based on the mapping table MT. For example, when there is a demand on determining a bit corresponding to the third PUF cell PUF003, the PUF cell controller 123 may select the third PUF cell PUF003 as a target PUF cell and may control the PUF cell array 110 such that sensing data are read from the third PUF cell PUF003. At the same time, the PUF cell controller 123 may control the PUF cell array 110 based on the mapping table MT such that sensing data are read from the 256th PUF cell PUF256 mapped onto the third PUF cell PUF003.

Two sensing data read from the third PUF cell PUF003 being the target PUF cell and the 256th PUF cell PUF256 mapped onto the target PUF cell may be provided to the bit determiner 124. The bit determiner 124 may determine determination data associated with the third PUF cell PUF003 being the target PUF cell based on the two sensing data. For example, the determination data associated with the third PUF cell PUF003 may be obtained by subtracting the sensing data of the 256th PUF cell PUF256 from the sensing data of the third PUF cell PUF003. The bit determiner 124 may determine a value of a target bit of the third PUF cell PUF003 based on the determination data associated with the third PUF cell PUF003.

In an example embodiment, values of the two sensing data respectively read from the third and 256th PUF cells PUF003 and PUF256 may be different from the raw data RD001 and RD193 mentioned to describe the mapping process due to various ambient factors. However, because determination data are generated based on sensing data from two PUF cells mapped in compliance with a condition and a target bit associated with a PUF cell is determined by using the generated determination data, a change (i.e., an error) in a target bit value due to various environment factors may decrease.

In an example embodiment, the number of indexes of the mapping table MT may be variously changed or modified depending on a way to implement embodiments of the inventive concept. For example, when the total number of PUF cells included in the PUF cell array 110 is "n" (n being a positive integer) and the number of discarded PUF cells is "k" (k being a positive integer less than "k"), the number of indexes of the mapping table MT may be "(n−k)/2." That is, the number of errors of the security device 100 may decrease by using a low-capacity mapping table MT.

The mapping table generating method or process described with reference to FIGS. 5A to 5C may be an example for describing an embodiment of the inventive concept easily, and the inventive concept is not limited thereto.

Figure 6A:
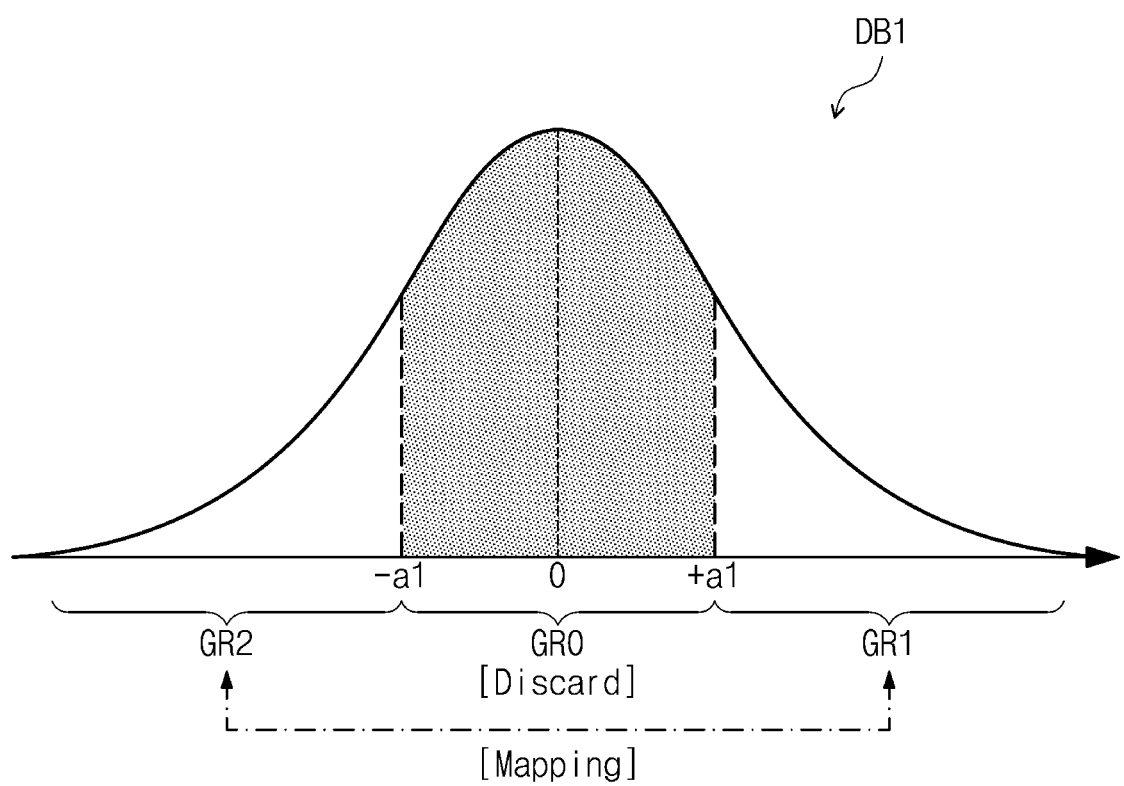
FIG. 6A is a graph illustrating a distribution corresponding to raw data from a plurality of PUF cells of a PUF cell array of FIG. 1.
Figure 6B:
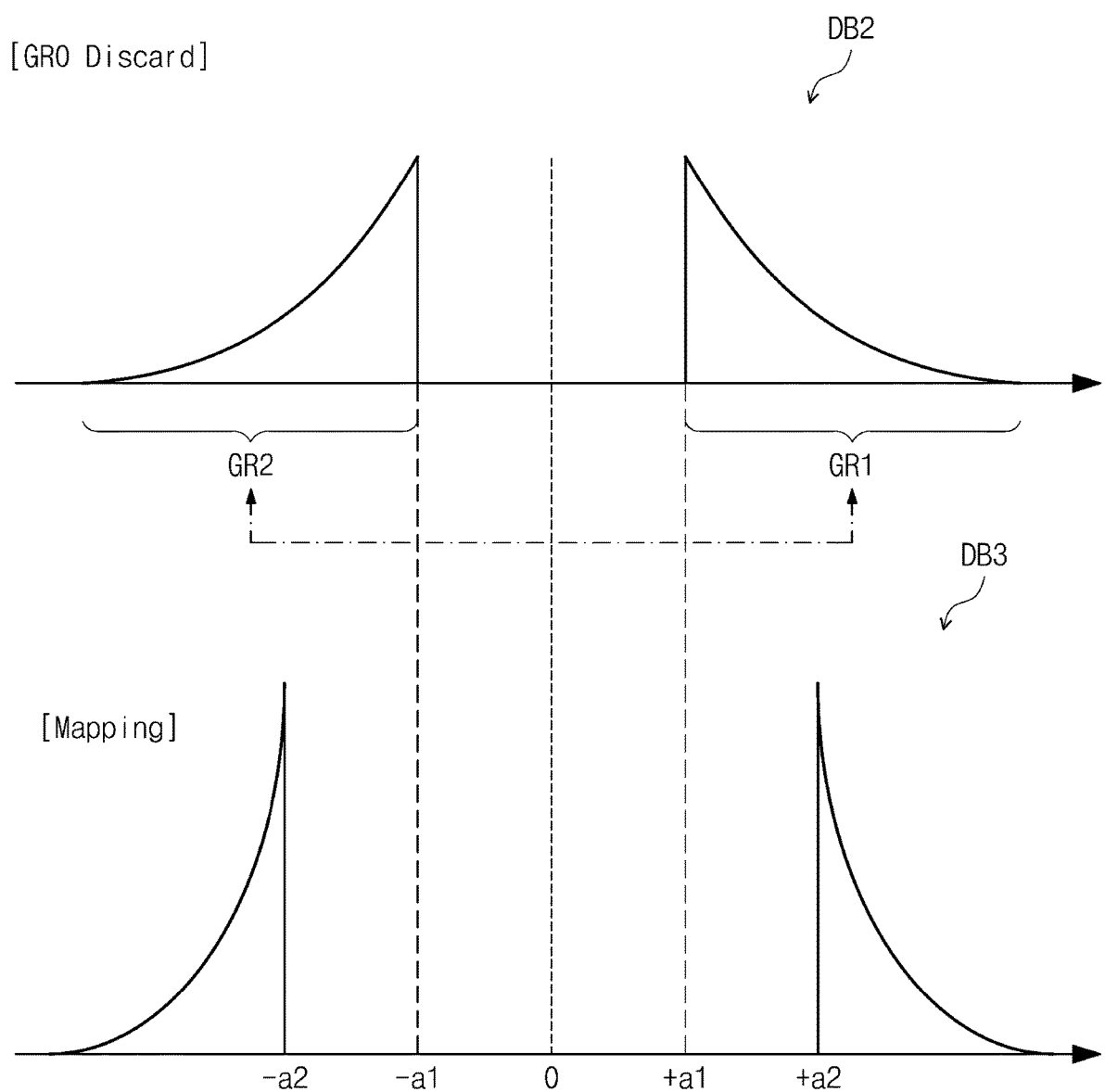
FIG. 6B illustrates graphs in which distributions of data processed according to embodiments from a distribution of FIG. 6A are included.

FIG. 6A is a graph illustrating a distribution corresponding to raw data from a plurality of PUF cells of the PUF cell array 110 of FIG. 1. FIG. 6B illustrates graphs in which distributions of data processed according to embodiments from a distribution of FIG. 6A are included. In an example embodiment, in FIGS. 6A and 6B, a horizontal axis represents a size of raw data, and a vertical axis represents the number of PUF cells.

In an example embodiment, raw data (or sensing data) obtained from a plurality of PUF cells may have a distribution. For example, the raw data (or sensing data) obtained from the plurality of PUF cells may have a characteristic of a normal distribution or a Gaussian distribution in which opposite sides are symmetrical with respect to a reference point (e.g., "0"). However, the inventive concept is not limited thereto. That is, raw data (or sensing data) of right PUF cells with respect to the reference point "0" may have a positive value or a positive polarity, and raw data (or sensing data) of left PUF cells with respect to the reference point "0" may have a negative value or a negative polarity.

A value of a target bit of a PUF cell may be determined based on a polarity of sensing data of PUF cells. However, a value of sensing data may vary depending on various ambient factors (e.g., a temperature, an operating time, and an operating voltage). In this case, a polarity of sensing data adjacent to the reference point "0" may change depending on various ambient factors. In this case, an unintended bit may be determined by the change of the value in the sensing data, thereby causing an increase of the number of errors occurring in a security device.

The security device 100 according to an embodiment of the inventive concept may classify the plurality of PUF cells into a plurality of groups based on reference values. For example, the security device 100 may obtain the raw data RD from the plurality of PUF cells. The raw data RD may have a first distribution DB1 illustrated in FIG. 6A. In an example embodiment, the first distribution DB1 may be a normal distribution or a Gaussian distribution in an ideal case, but the inventive concept is not limited thereto.

In the first distribution DB1, the security device 100 may classify PUF cells corresponding to raw data greater than the first positive reference value +a1 as the first group GR1, may classify PUF cells corresponding to raw data smaller than the first negative reference value −a1 as the second group GR2, and may classify PUF cells corresponding to raw data smaller than the first positive reference value +a1 and greater than the first negative reference value −a1 as the 0-th group GR0.

As described above, sensing data read from the PUF cells included in the first group GR1 may have a positive polarity. In this case, because the sensing data corresponding to the PUF cells included in the first group GR1 are relatively distant from the reference point "0," the probability that a polarity is changed by various ambient factors may be low. Likewise, because the sensing data corresponding to the PUF cells included in the second group GR2 have a negative polarity and are relatively distant from the reference point "0," the probability that a polarity is changed by various ambient factors may be low. In other words, the PUF cells included in the first and second groups GR1 and GR2 may be stable PUF cells.

In contrast, sensing data read from the PUF cells included in the 0-th group GR0 may have a positive polarity or a negative polarity. In this case, because the sensing data read from the PUF cells included in the 0-th group GR0 are relatively close to the reference point "0" (in other words, because an absolute value of sensing data is relatively small), the probability that a polarity is changed by various ambient factors may be high. That is, the PUF cells included in the 0-th groups GR0 may be unstable PUF cells.

The security device 100 according to an embodiment of the inventive concept may be configured to generate a mapping table by discarding raw data corresponding to the PUF cells (i.e., unstable PUF cells) included in the 0-th group GR0 of the first distribution DB1 and mapping the remaining raw data. In other words, the security device 100 may generate a mapping table based on raw data (i.e., stable data) corresponding to stable PUF cells. In the case in which a PUF key (or the security key PUF_KEY) is generated by using the mapping table generated based on the stable PUF cells, an effective margin between polarities may increase, thus improving the reliability of the security device 100.

For example, as illustrated in FIG. 6B, in the case in which raw data corresponding to the PUF cells (i.e., unstable PUF cells) included in the 0-th group GR0 are discarded from the first distribution DB1, the remaining raw data (i.e., stable data) may have a second distribution DB2. In an example embodiment, the second distribution DB2 may be a bimodal distribution. In this case, an effective margin between raw data present on opposite sides of the reference point "0" may be 2a1 (=+a1−(−a1)).

In contrast, determination data that are generated by using the mapping table MT generated according to an embodiment of the inventive concept may have a third distribution DB3. For example, the determination data that are generated by using the mapping table MT may be data that are generated based on sensing data of a target PUF cell and sensing data of another PUF cell mapped onto the target PUF cell. This is described above, and thus, additional description will be omitted to avoid redundancy. In an example embodiment, the third distribution DB3 may be a bimodal distribution. In the third distribution DB3, an effective margin between data corresponding to respective polarities may be 2a2 (=+a2−(−a2)). In this case, an absolute value of "a2" may be greater than an absolute value of "a1."

That is, the security device 100 according to an embodiment of the inventive concept may classify a plurality of PUF cells into a plurality of groups based on raw data of the plurality of PUF cells and reference values and may discard PUF cells (or raw data corresponding to the PUF cells) included in a group of the plurality of groups. Also, the security device 100 may extract stable data based on the raw data of the plurality of PUF cells and the reference values. The security device 100 may generate the mapping table MT by mapping the remaining PUF cells (i.e., stable PUF cells) based on raw data not discarded or extracted stable data. The security device 100 may determine target bits of the plurality of PUF cells (i.e., stable PUF cells) by using the generated mapping table MT and may generate the security key PUF_KEY by combining the determined target bits. In this case, as described above, an effective margin between polarities may increase, and thus, an error ratio of target bits may decrease. Accordingly, the reliability of the security device 100 may be improved. Also, because the security device 100 maintains a low-capacity mapping table, costs may be prevented from increasing due to a separate circuit for storing a mapping table.

Figure 7:
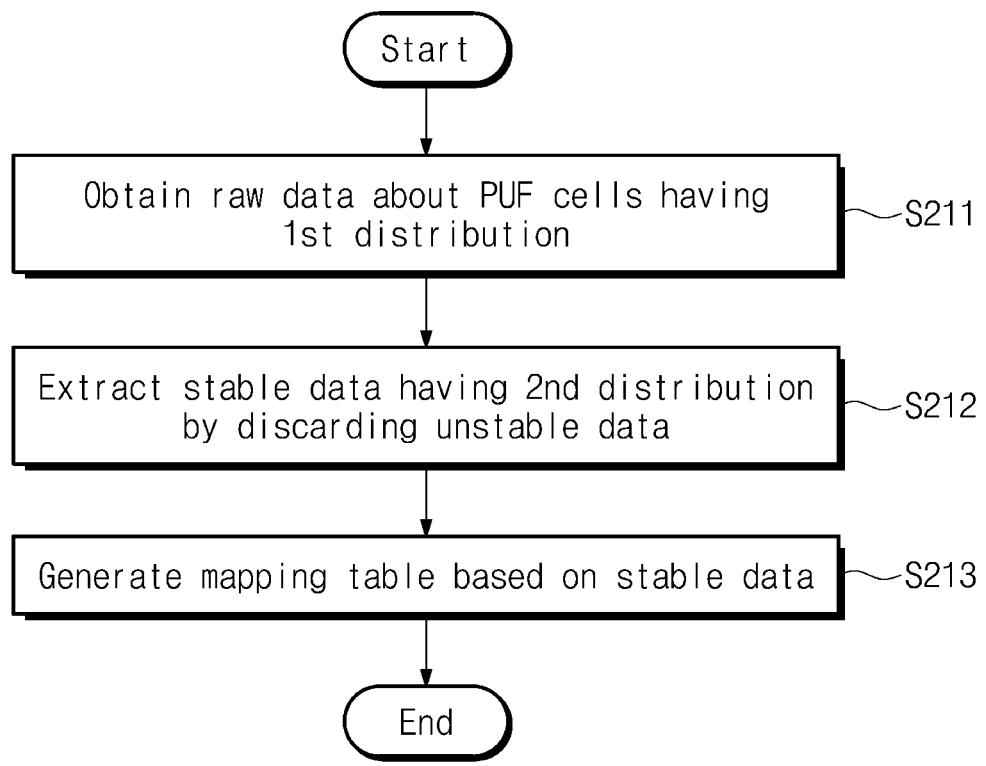
FIG. 7 is a flowchart illustrating an operation of the security device of FIG. 1.

FIG. 7 is a flowchart illustrating an operation of the security device 100 of FIG. 1. In an example embodiment, the flowchart of FIG. 7 will be described with reference to the security device 100, but the inventive concept is not limited thereto. For example, the flowchart of FIG. 7 may be performed by various other components.

Referring to FIGS. 1, 2, and 7, in operation S211, the security device 100 may read raw data from each of a plurality of PUF cells. In an example embodiment, the raw data read from the plurality of PUF cells in operation S211 may have the first distribution DB1 (refer to FIG. 6A). In an example embodiment, the first distribution DB1 may be a normal distribution or a Gaussian distribution in an ideal case, but the inventive concept is not limited thereto.

In operation S212, the security device 100 may extract stable data by discarding unstable data from the read raw data. For example, the security device 100 may classify the plurality of PUF cells into the plurality of groups GR0, GR1, and GR2 as illustrated in FIG. 6A. The security device 100 may discard raw data corresponding to PUF cells (or unstable PUF cells) included in a group (e.g., the 0-th group GR0) of the plurality of groups GR0, GR1, and GR2 from the first distribution DB1. In this case, only raw data corresponding to PUF cells (i.e., stable PUF cells) included in the first and second groups GR1 and GR2 may remain, and a distribution of the remaining raw data may be the same as the second distribution DB2 of FIG. 6B.

In operation S213, the security device 100 may generate the mapping table MT based on the stable data. For example, the security device 100 may map the PUF cells of the first group GR1 and the second group GR2 in the second distribution DB2 as illustrated in FIG. 6B. This is described above, and thus, additional description will be omitted to avoid redundancy. The security device 100 may store a mapping result as the mapping table MT.

In an example embodiment, the security device 100 may determine target bits of the plurality of PUF cells by using the generated mapping table MT and may generate the security key PUF_KEY based on the determined target bits. A configuration for determining target bits by using the mapping table MT and generating the security key PUF_KEY is described above, and thus, additional description will be omitted to avoid redundancy.

Figure 8:
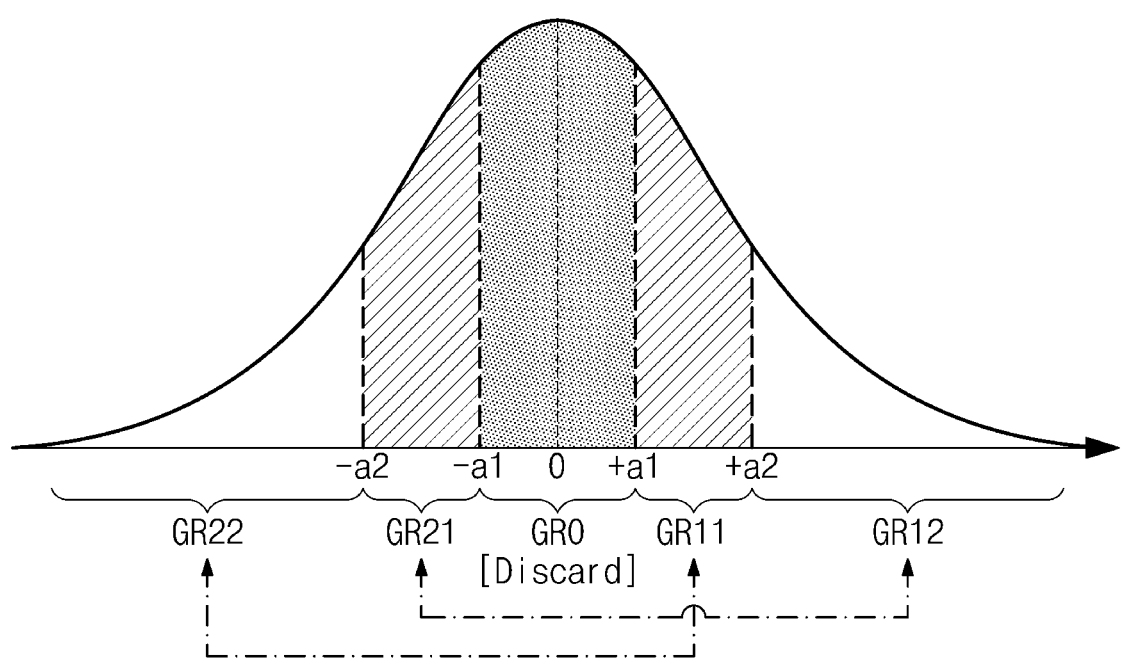
FIG. 8 is a graph for describing an operation of the security device of FIG. 1.

FIG. 8 is a graph for describing an operation of the security device 100 of FIG. 1. In FIG. 8, a horizontal axis represents a size of raw data of each of the plurality of PUF cells, and a vertical axis represents the number of PUF cells.

Referring to FIGS. 1, 2, and 8, the security device 100 may read a plurality of raw data from a plurality of PUF cells. A distribution of the raw data may be the same as the first distribution DB1 of FIG. 8. In an ideal case, the first distribution DB1 may be a normal distribution or a Gaussian distribution, but the inventive concept is not limited thereto.

In the embodiments described with reference to FIGS. 1 to 7, the plurality of PUF cells are classified into three groups GR0, GR1, and GR2. However, the inventive concept is not limited thereto.

The security device 100 may classify a plurality of PUF cells into a plurality of groups based on a plurality of reference values. In detail, as illustrated in FIG. 8, the plurality of PUF cells may be classified 5 groups GR0, GR11, GR12, GR21, and GR22 based on 4 reference values $-a2$, $-a1$, $+a1$, and $+a2$. PUF cells having raw data greater than the second positive reference value $+a2$ may be included in group G12, PUF cells having raw data smaller than the second positive reference value $+a2$ and greater than the first positive reference value $+a1$ may be included in group G11, PUF cells having raw data smaller than the second negative reference value $-a2$ may be included in group G22, and PUF cells having raw data greater than the second negative reference value $-a2$ and smaller than the first negative reference value $-a1$ may be included in group G21. PUF cells having raw data greater than the first negative reference value $-a1$ and smaller than the first positive reference value $+a1$ may be included in group GR0.

As in the above description, the PUF cells included in group GR0 may be unstable PUF cells, and raw data corresponding to the unstable PUF cells may be discarded. Afterwards, the security device 100 may generate the mapping table MT based on the remaining raw data. In this case, the PUF cells of group GR12 may be mapped onto the PUF cells of group GR21, and the PUF cells of group GR11 may be mapped onto the PUF cells of group GR22.

For example, raw data of the PUF cells of group GR12 may be further from the reference point "0" than raw data of the PUF cells of group GR11. That is, the probability that an error occurs in the PUF cells of group GR12 due to various factors may be lower than the probability that an error occurs in the PUF cells of group GR11 due to the various factors. In other words, all the PUF cells of group GR12 and group GR11 may have a positive polarity, but the PUF cells of group GR12 may be more stable than the PUF cells of group GR11.

Likewise, raw data of the PUF cells of group GR22 may be further from the reference point "0" than raw data of the PUF cells of group GR21. That is, all the PUF cells of group GR22 and group GR21 may have a negative polarity, but the PUF cells of group GR22 may be more stable than the PUF cells of group GR21.

In this case, the PUF cells of group GR12, which are relatively more stable and have a positive polarity, may be mapped onto the PUF cells of group GR21, which are relatively less stable and have a negative polarity; the PUF cells of group GR22, which are relatively more stable and have a negative polarity, may be mapped onto the PUF cells of group GR11, which are relatively less stable and have a positive polarity. Accordingly, the overall reliability of the security key PUF_KEY generated by the security device 100 may be improved.

Figure 9:
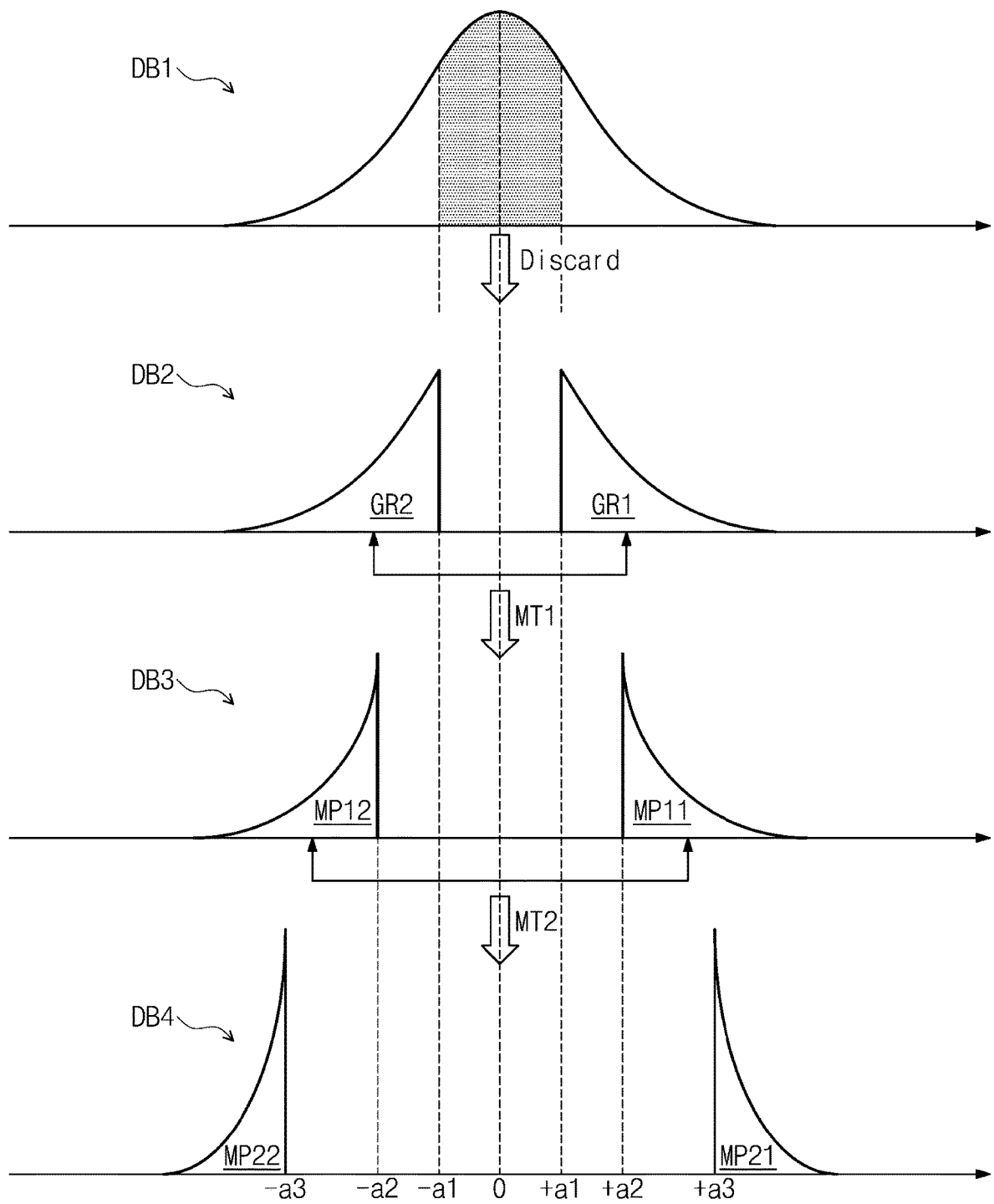
FIG. 9 illustrates graphs for describing an operation of the security device of FIG. 1.

FIG. 9 illustrates graphs for describing an operation of the security device 100 of FIG. 1. For convenience of description, additional description associated with the above-described components will be omitted to avoid redundancy.

Referring to FIGS. 1, 2, and 9, the security device 100 may read raw data having the first distribution DB1. Afterwards, the security device 100 may extract stable data having the second distribution DB2 by discarding unstable data from the first distribution DB1. For example, the unstable data may be data, which have a value greater than the first negative reference value $-a1$ and smaller than the first positive reference value $+a1$, from among the raw data. Alternatively, the unstable data may be data corresponding to PUF cells included in a group (e.g., GR0) of a plurality of groups classified by the security device 100. This is described above, and thus, additional description will be omitted to avoid redundancy.

The stable data that do not include the unstable data may have the second distribution DB2 illustrated in FIG. 9. As in the description given with reference to FIG. 6B, the second distribution DB2 may be classified into the first group GR1 and the second group GR2. As in the above description, the security device 100 may generate a first mapping table MT1 by mapping the PUF cells of the first group GR1 onto the PUF cells of the second group GR2.

The security device 100 may generate determination data by using the first mapping table MT1 generated based on the second distribution DB2. In an example embodiment, the determination data may indicate a difference between two raw data read from two PUF cells based on mapping information that is based on the first mapping table MT1.

The determination data that is based on the first mapping table MT1 may have the third distribution DB3 illustrated in FIG. 9. The third distribution DB3 may be classified into group MP11 and group MP12. Data corresponding to group MP11 may have a positive polarity, and data corresponding to group MP12 may have a negative polarity. Group MP11 and group MP12 may be spaced from each other as much as $2a2$ ($=+a2-(-a2)$) (here, an absolute value of "a2" being greater than an absolute value of "a1"). That is, the determination data having the third distribution DB3 may have an effective margin as much as "2a2."

Afterwards, the security device 100 may generate a second mapping table MT2 by mapping the determination data of group MP11 and group MP12 in the third distribution DB3. The security device 100 may generate determination data by using the second mapping table MT2 generated based on the third distribution DB3. The determination data that is based on the second mapping table MT2 may have a fourth distribution DB4 illustrated in FIG. 9. The fourth distribution DB4 may be classified into group MP21 and group MP22, and group MP21 and group MP22 may be spaced from each other as much as $2a3$ ($=+a3-(-a3)$) (here, an absolute value of "a3" being greater than an absolute value of "a2"). That is, the determination data having the fourth distribution DB4 may have an effective margin as much as "2a3."

An embodiment in which a mapping operation is performed two times is described with reference to FIG. 9, but the inventive concept is not limited thereto. For example, the security device 100 according to an embodiment of the inventive concept may repeatedly perform the mapping operation "i" times (i being a positive integer) such that an intended effective margin is obtained.

As described above, the security device 100 according to an embodiment of the inventive concept may obtain a plurality of raw data from the one PUF cell array 110 and may discard unstable data of the obtained raw data. Afterwards, an effective margin of determination data may be expanded by repeatedly performing a mapping operation on the remaining raw data.

Figure 10:
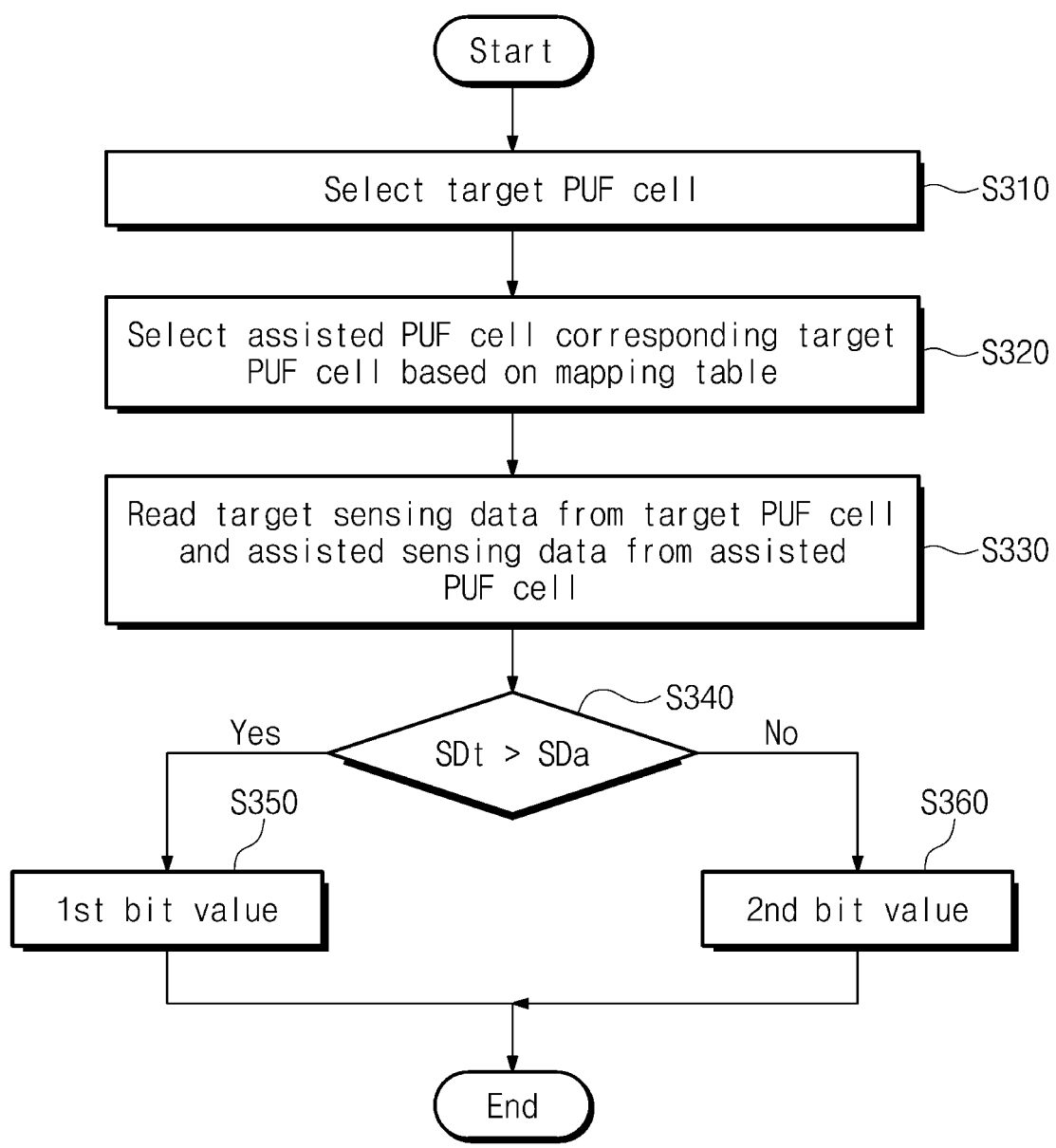
FIG. 10 is a flowchart illustrating an operation of the security device of FIG. 1.

FIG. 10 is a flowchart illustrating an operation of the security device 100 of FIG. 1. An operation of determining a target bit based on a mapping table described with reference to FIGS. 1 to 9 will be described with reference to FIG. 10. For convenience of description, it is assumed that, before an operation according to the flowchart of FIG. 10 is performed, the security device 100 includes the mapping table MT generated based on the method described with reference to FIGS. 1 to 9.

Referring to FIGS. 1 and 10, in operation S310, the security device 100 may select a target PUF cell of a plurality of PUF cells. For example, the controller 120 of the security device 100 may select the target PUF cell of the plurality of PUF cells for the purpose of performing a bit determination operation on each of the plurality of PUF cells. In an example embodiment, the target PUF cell may be the above-described stable PUF cell (e.g., a PUF cell included in the first group GR1 or the second group GR2 of FIG. 6A). In an example embodiment, an unstable PUF cell (e.g., a PUF cell included in the 0-th group GR0 of FIG. 6A) of the plurality of PUF cells may not be selected as the target PUF cell. In an example embodiment, the operation of selecting the target PUF cell may be performed by the PUF cell controller 123 (refer to FIG. 2) of the controller 120.

In operation S320, the security device 100 may select an assisted PUF cell corresponding to the target PUF cell based on the mapping table MT. For example, as described above, the controller 120 of the security device 100 may include the mapping table MT including mapping information between stable PUF cells. The controller 120 may select a PUF cell mapped onto the target PUF cell as the assisted PUF cell from the mapping table MT. In an example embodiment, the operation of selecting the assisted PUF cell may be performed by the PUF cell controller 123 (refer to FIG. 2) of the controller 120.

In operation S330, the security device 100 may read sensing data (for convenience of description, referred to as "target sensing data SDt") from the target PUF cell and may read sensing data (for convenience of description, referred to as "assisted sensing data SDa") from the assisted PUF cell. For example, the controller 120 of the security device 100 may transmit the control signal CTRL to the PUF cell array 110, and the PUF cell array 110 may provide the controller 120 with the target sensing data SDt of the target PUF cell and the assisted sensing data SDa of the assisted PUF cell in response to the control signal CTRL.

In operation S340, the security device 100 may compare a size of the target sensing data SDt and a size of the assisted sensing data SDa. When the size of the target sensing data SDt is larger than the size of the assisted sensing data SDa, in operation S350, the security device 100 may determine a target bit of the target PUF cell as a first bit value (e.g., "bit 1"). When the size of the target sensing data SDt is not larger than the size of the assisted sensing data SDa, in operation S360, the security device 100 may determine the target bit of the target PUF cell as a second bit value (e.g., "bit 0").

For example, in a distribution illustrated in FIG. 6A, in the case in which the target PUF cell is included in the first group GR1, the assisted PUF cell may be included in the second group GR2. That is, the size of the target sensing data SDt read from the target PUF cell of the first group GR1 may be larger than the size of the assisted sensing data SDa read from the assisted PUF cell of the second group GR2. In this case, it may be determined that the target PUF cell has a positive polarity, and thus, the target bit of the target PUF cell may be determined as the first bit value.

In contrast, in the distribution illustrated in FIG. 6A, in the case in which the target PUF cell is included in the second group GR2, the assisted PUF cell may be included in the first group GR1, and the size of the target sensing data SDt may not be larger than the size of the assisted sensing data SDa. In this case, it may be determined that the target PUF cell has a negative polarity, and thus, the target bit of the target PUF cell may be determined as the second bit value.

That is, as described above, because a target bit of a target PUF cell is determined based on assisted sensing data read from an assisted PUF cell logically spaced from the target PUF cell, an error of the target bit may decrease.

In an example embodiment, the security device 100 may determine a target bit associated with each of a plurality of PUF cells by repeatedly performing the above operation. The security device 100 may generate the security key PUF_KEY based on the determined target bits. In an example embodiment, target PUF cells selected in the security device 100 may be stable PUF cells of a plurality of PUF cells, and the number of target PUF cells may be less than the number of the plurality of PUF cells.

As described above, the security device 100 according to an embodiment of the inventive concept may discard unstable data from raw data read from a plurality of PUF cells and may generate the mapping table MT based on the remaining raw data. The security device 100 may determine a target bit of a target PUF cell based on the mapping table MT thus generated. Accordingly, a security device having improved reliability is provided.

Figure 11:
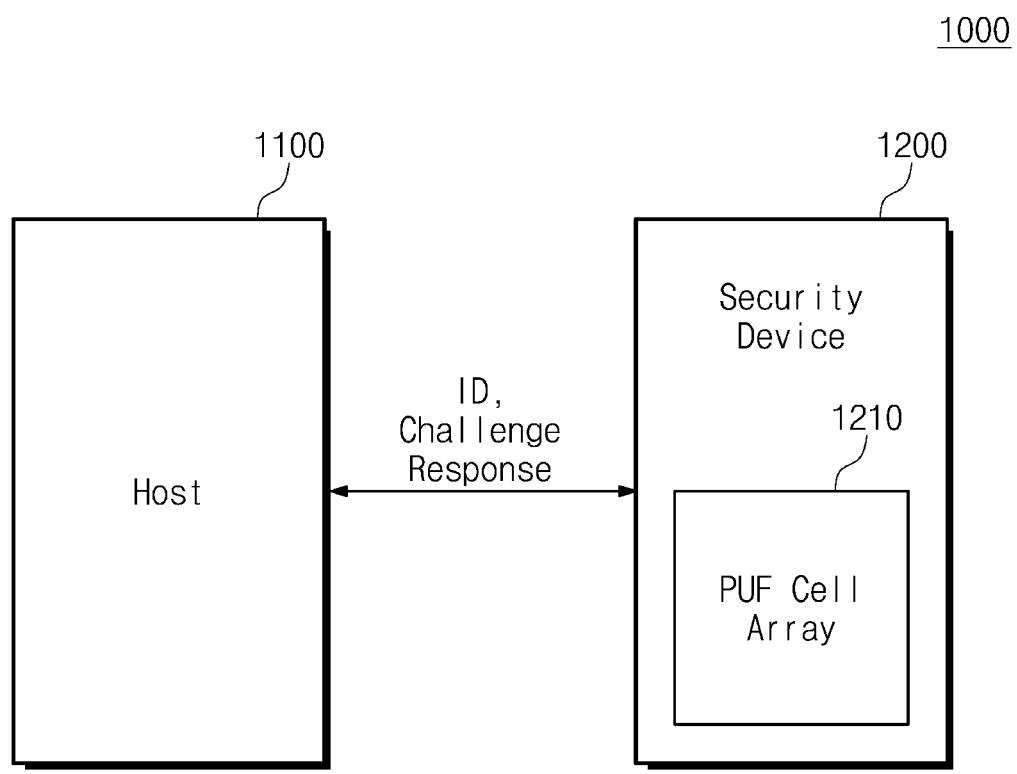
FIG. 11 is a block diagram illustrating an electronic system to which a security device according to embodiments is applied.

FIG. 11 is a block diagram illustrating an electronic system 1000 to which a security device according to embodiments is applied. Referring to FIG. 11, the electronic system 1000 may include a host 1100 and a security device 1200. The electronic system 1000 may be an electronic device such as a portable communication terminal, a personal digital assistant (PDA), a portable multimedia player (PMP), a smartphone, a digital camera, or a wearable device.

The host 1100 may be configured to control the security device 1200. The security device 1200 may include a PUF cell array 1210 and may be configured to operate under control of the host 1100. In an example embodiment, the security device 1200 may be a smart card such as an IC card or a chip card or may indicate a hardware component separately provided to generate a security key.

For example, the host 1100 may receive a device identifier ID from the security device 1200. The host 1100 may transmit a challenge to the security device 1200 based on the received device identifier ID. The security device 1200 may transmit a response to the host 1100 in response to the challenge from the host 1100. In an example embodiment, the response may be the security key PUF_KEY described with reference to FIGS. 1 to 10. That is, the security device 1200 may obtain data, which are based on the challenge from the host 1100, from a plurality of PUF cells included in the PUF cell array 1210, may generate the response (i.e., a PUF key) based on the obtained data, and may transmit the response to the host 1100. In an example embodiment, the security device 1200 may generate the mapping table MT based on the method described with reference to FIGS. 1 to 9 and may generate a PUF key by using the generated mapping table MT.

The host 1100 may perform an authentication operation on the security device 1200 or any other devices based on the received response.

According to an embodiment of the inventive concept, a security device includes a plurality of physical unclonable function (PUF) cells, a receiver that receives a plurality of raw data from the plurality of PUF cells, a mapping table generator that discards unstable data from the plurality of raw data to extract stable data and maps stable PUF cells corresponding to the extracted stable data from among the plurality of PUF cells to generate a mapping table, a storage circuit that stores the mapping table, a PUF cell controller that controls the stable PUF cells based on the mapping table, and a bit determiner that outputs a security key corresponding to the stable PUF cells based on the mapping table.

In an example embodiment, the plurality of raw data include mismatch information determined depending on at least one physical characteristic of each of the plurality of PUF cells In an example embodiment, the unstable data are raw data, which are greater than a first negative reference value and are smaller than a first positive reference value, from among the plurality of raw data.

In an example embodiment, first stable PUF cells of the stable PUF cells correspond to raw data greater than the first positive reference value, and second stable PUF cells of the stable PUF cells correspond to raw data smaller than the first negative reference value.

In an example embodiment, the mapping table generator generates the mapping table by mapping the first stable PUF cells and the second stable PUF cells in a 1:1 correspondence.

In an example embodiment, the mapping table includes mapping information between one of the first stable PUF cells and one of the second stable PUF cells, and the bit determiner generates first determination data based on first raw data from the one of the first stable PUF cells and second raw data from the one of the second stable PUF cells and determines a bit value of the one of the first stable PUF cells based on a polarity of the first determination data.

According to an embodiment of the inventive concept, an operation method of a security device that includes a plurality of physical unclonable function (PUF) cells includes obtaining a plurality of raw data from the plurality of PUF cells, extracting stable data by discarding unstable data of the plurality of raw data, generating a mapping table based on the extracted stable data, generating determination data associated with stable PUF cells corresponding to the stable data from among the plurality of PUF cells based on the mapping table, and generating a security key corresponding to the stable PUF cells based on the determination data.

In an example embodiment, the plurality of raw data have a first distribution, the extracted stable data have a second distribution, and the determination data have a third distribution.

In an example embodiment, the first distribution is a normal distribution, each of the second and third distributions is a bimodal distribution, and an effective margin of the third distribution is greater than an effective margin of the second distribution.

In an example embodiment, the unstable data are raw data, which are greater than a first negative reference value and is smaller than a first positive reference value, from among the plurality of raw data, and an effective margin of the second distribution is two times the first positive reference value, and an effective margin of the third distribution is greater than the effective margin of the second distribution.

According to embodiments of the inventive concept, a security device may discard raw data (e.g., raw data corresponding to unstable PUF cells or unstable data) of raw data obtained from a plurality of PUF cells and may generate a mapping table for PUF cells based on the remaining raw data. The security device may expand an effective margin for determining a PUF key by generating the PUF key by using the generated mapping table. Accordingly, there are provided a security device including PUF cells having improved reliability and an operation method thereof.

As is traditional in the field of the inventive concepts, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

While the inventive concept has been described with reference to example embodiments thereof, it will be apparent to those of ordinary skill in the art that various changes and modifications may be made thereto without departing from the spirit and scope of the inventive concept as set forth in the following claims.

What is claimed is:

1. A security device comprising:
a physical unclonable function (PUF) cell array comprising a plurality of PUF cells; and
a controller configured to control the PUF cell array to generate a security key, and comprising:
a receiver configured to receive raw data from the plurality of PUF cells;
a mapping table generator configured to:
extract stable data from the received raw data by discarding unstable data of the received raw data; and
generate a mapping table based on stable PUF cells corresponding to the extracted stable data, among the plurality of PUF cells;
a storage circuit configured to store the mapping table;
a PUF cell controller configured to read sensing data from the stable PUF cells, based on the generated mapping table; and a bit determiner configured to generate the security key, based on the read sensing data, wherein the sensing data comprises target sensing data and assisted sensing data, and wherein the PUF cell controller is further configured to:
  select a target PUF cell from the stable PUF cells;
  select an assisted PUF cell corresponding to the selected target PUF cell, from the stable PUF cells, based on the mapping table; and
  control the PUF cell array such that the target sensing data are read from the selected target PUF cell and the assisted sensing data are read from the selected assisted PUF cell.

2. The security device of claim 1, wherein the stable data comprises first stable data and second stable data,
  wherein a first value of the first stable data is greater than or equal to a first positive reference value,
  wherein a second value of the second stable data is less than or equal to a first negative reference value,
  wherein a third value of the unstable data is less than the first positive reference value and is greater than the first negative reference value, and
  wherein the mapping table generator is further configured to generate the mapping table by mapping first stable PUF cells corresponding to the first stable data, among the stable PUF cells, to second stable PUF cells corresponding to the second stable data, among the stable PUF cells, in a 1:1 correspondence.

3. The security device of claim 2, wherein the raw data comprises mismatch information that is determined based on a physical characteristic of each of the plurality of PUF cells.

4. The security device of claim 2, wherein the mapping table comprises physical address information of each of the first stable PUF cells and the second stable PUF cells mapped in the 1:1 correspondence, and does not comprise the received raw data, and
  wherein the mapping table generator is further configured to, after the generate mapping table is stored in the storage circuit, discard the received raw data.

5. The security device of claim 1, wherein the bit determiner is further configured to:
  compare the read target sensing data with the read assisted sensing data; and
  determine a target bit value of the target PUF cell, based on a result of the comparison.

6. The security device of claim 5, wherein the bit determiner is further configured to:
  based on a first value of the read target sensing data being greater than a second value of the read assisted sensing data, determine the target bit value to be a first bit value; and
  based on the first value of the read target sensing data less than or equal to the second value of the read assisted sensing data, determine the target bit value to be a second bit value different than the first bit value.

7. An operation method of a security device comprising a plurality of physical unclonable function (PUF) cells, the operation method comprising:
  reading raw data from the plurality of PUF cells;
  extracting stable data from the read raw data by discarding unstable data of the read raw data;
  generating a mapping table by mapping stable PUF cells corresponding to of the extracted stable data;
  selecting a target PUF cell from the plurality of PUF cells;
  selecting an assisted PUF cell corresponding to the selected target PUF cell, from the stable PUF cells, based on the mapping table;
  reading target sensing data from the selected target PUF cell;
  reading assisted sensing data from the selected assisted PUF cell;
  determining a target bit value of the target PUF cell, based on the read target sensing data and the read assisted sensing data; and
  generating a secure key based on the target bit value.

8. The operation method of claim 7, wherein the raw data comprises mismatch information that is determined based on a physical characteristic of each of the plurality of PUF cells.

9. The operation method of claim 7, wherein the stable data have values less than a first negative reference value and/or greater than a first positive reference value.

10. The operation method of claim 7, wherein the unstable data have values less than a first positive reference value and greater than a first negative reference value.

11. The operation method of claim 7, wherein the determining of the target bit value comprises:
  determining whether a first value of the read target sensing data is greater than a second value of the read assisted sensing data;
  based on the first value of the read target sensing data being determined to be greater than the second value of the read assisted sensing data, determining the target bit value to be a first bit value; and
  based on the first value of the read target sensing data being determined to be less than or equal to the second value of the read assisted sensing data, determining the target bit value to be a second bit value different from the first bit value.

12. The operation method of claim 7, wherein the target PUF cell is selected from the stable PUF cells.

13. The operation method of claim 7, wherein the generating of the mapping table comprises:
  classifying the stable PUF cells into a first group and a second group; and
  generating the mapping table to include information in which the first group is mapped to the second group in a 1:1 correspondence.

14. The operation method of claim 13, wherein the mapping table does not comprise the received raw data.

15. An operation method of a security device comprising a plurality of physical unclonable function (PUF) cells, the operation method comprising:
  reading raw data from the plurality of PUF cells;
  extracting stable data from the read raw data by discarding unstable data of the read raw data;
  generating a mapping table based on the extracted stable data;
  reading sensing data from stable PUF cells corresponding to the extracted stable data, among the plurality of PUF cells, based on the generated mapping table;
  generating determination data, based on the read sensing data; and
  generating a security key based on the generated determination data,
  wherein the raw data has a first distribution, the stable data has a second distribution different from the first distribution, and the determination data has a third distribution different from the first distribution and the second distribution,
  wherein the sensing data comprises target sensing data and assisted sensing data, and
  wherein the target sensing data is read from a target PUF cell, wherein the assisted sensing data is read from an assisted PUF cell, wherein the target PUF cells is selected from the stable PUF cells corresponding to the extracted stable data, among the plurality of PUF cells, and wherein the assisted PUF cell is selected from the stable PUF cells corresponding to the extracted stable data, among the plurality of PUF cells, based on the generated mapping table.

16. The operation method of claim 15, wherein the first distribution of the raw data is a normal distribution, and wherein the second distribution and the third distribution are bimodal distributions having different effective margins.

17. The operation method of claim 16, wherein a first effective margin of the third distribution is greater than a second effective margin of the second distribution.

18. The operation method of claim 15, wherein the generating of the security key comprises:

determining a first bit value corresponding to first data having a positive polarity from among the determination data, to have a first value;

determining a second bit value corresponding to second data having a negative polarity from among the determination data, to have a second value; and combining the determined first bit value and the determined second bit value to generate the security key.

19. The operation method of claim 15, further comprising: discarding the read raw data after storing the mapping table.

* * * * *